United States Patent
Tong et al.

(10) Patent No.: US 9,356,735 B2
(45) Date of Patent: *May 31, 2016

(54) SPACE-TIME BLOCK CODING SYSTEMS AND METHODS

(75) Inventors: Wen Tong, Ottawa (CA); Ming Jia, Ottawa (CA); Peiying Zhu, Kanata (CA); Alexandre Mikhailovich Chloma, Moscow (RU); Mikhail Germanovich Bakouline, Moskovskaya obl. (RU); Vitali Borisovich Kreindeline, Moscow (RU)

(73) Assignee: BlackBerry Limited, Waterloo, Ontario (CA)

( * ) Notice: Subject to any disclaimer, the term of this patent is extended or adjusted under 35 U.S.C. 154(b) by 715 days.

This patent is subject to a terminal disclaimer.

(21) Appl. No.: 13/615,341

(22) Filed: Sep. 13, 2012

(65) Prior Publication Data

US 2013/0003795 A1   Jan. 3, 2013

Related U.S. Application Data

(63) Continuation of application No. 11/547,187, filed as application No. PCT/RU2004/000127 on Apr. 1, 2004, now Pat. No. 8,411,787.

(51) Int. Cl.
| | | |
|---|---|---|
| *H04L 27/00* | (2006.01) | |
| *H03K 9/00* | (2006.01) | |
| *H04L 1/06* | (2006.01) | |

(52) U.S. Cl.
CPC .................................. *H04L 1/0618* (2013.01)

(58) Field of Classification Search
USPC ......... 375/219–220, 259, 261, 265, 278, 284, 375/298, 309, 343, 350, 240.26–240.29, 375/229–236, 295, 296, 299–301, 316, 375/324–326, 340–341, 346, 347, 221, 375/240.26–240.27, 285, 302, 320, 322, 375/348, 349, 354; 455/132–141
See application file for complete search history.

(56) References Cited

U.S. PATENT DOCUMENTS

| | | |
|---|---|---|
| 6,185,258 B1 | 2/2001 | Alamouti et al. |
| 7,436,896 B2 | 10/2008 | Hottinen et al. |

(Continued)

FOREIGN PATENT DOCUMENTS

| | | |
|---|---|---|
| CN | 1481630 A | 3/2004 |
| CN | 1484899 A | 3/2004 |

OTHER PUBLICATIONS

Chinese Office Action dated Apr. 14, 2014 in Chinese Application No. 201110092443.4.

(Continued)

*Primary Examiner* — Linda Wong
(74) *Attorney, Agent, or Firm* — Conley Rose, P.C.; J. Robert Brown, Jr.

(57) ABSTRACT

Although orthonormal space-time coding matrices provide for optimal communication system performance in that associated correlation matrices include no non-zero off-diagonal elements, unity code rate orthonormal coding matrices are difficult to identify for arbitrary communication network equipment. According to embodiments of the present invention, non-orthonormal space-time coding matrices, for which associated correlation matrices include non-zero off-diagonal elements, are used to encode data symbols. The non-orthonormal space-time coding matrices are more easily determined, and undesirable effects of the non-zero off-diagonal components are reduced by selecting a coding matrix from among a number of such matrices. For example, a particular space-time coding matrix may be selected from a number of generated space-time coding matrices based on a number of non-zero off-diagonal elements or a power of a trace of the associated correlation matrices.

18 Claims, 8 Drawing Sheets

(56) References Cited

U.S. PATENT DOCUMENTS

| | | | |
|---|---|---|---|
| 8,411,787 | B2 | 4/2013 | Tong et al. |
| 8,422,585 | B2 | 4/2013 | Tong et al. |
| 2003/0032452 | A1 | 2/2003 | Tong et al. |
| 2003/0210750 | A1 | 11/2003 | Onggosanusi et al. |
| 2004/0002364 | A1 | 1/2004 | Trikkonen et al. |
| 2004/0057530 | A1 | 3/2004 | Tarokh et al. |
| 2004/0081131 | A1 | 4/2004 | Walton et al. |
| 2005/0013352 | A1 | 1/2005 | Hottinen |
| 2005/0048933 | A1* | 3/2005 | Wu et al. ............... 455/101 |
| 2008/0080633 | A1* | 4/2008 | Botha et al. ............ 375/267 |
| 2008/0095217 | A1 | 4/2008 | Ando |
| 2010/0002570 | A9 | 1/2010 | Walton et al. |
| 2013/0003885 | A1 | 1/2013 | Tong et al. |

OTHER PUBLICATIONS

Chinese Office Action dated Jul. 31, 2013 in Chinese Application No. 201110092443.4.
Fan Pingyi; "Design of Diagonal Algebraic Space Time Codes With 8-Star-Psk Signals"; The 14th IEEE International Symposium on Personal, Indoor and Mobile Radio Communication Proceedings; 2003; 5 pages.
Ma, Qian, et al.; "Full Diversity Block Diagonal Codes for Differential Space-Time-Frequency Coded OFDM"; IEEE; 2003; 5 pages.
Office Action dated Dec. 21, 2009; U.S. Appl. No. 11/547,187, filed Nov. 24, 2008; 15 pages.
Office Action dated Jun. 22, 2010; U.S. Appl. No. 11/547,187, filed Nov. 24, 2008; 16 pages.
Final Office Action dated Jan. 20, 2011; U.S. Appl. No. 11/547,187, filed Nov. 24, 2008; 19 pages.
Advisory Action dated May 9, 2011; U.S. Appl. No. 11/547,187, filed Nov. 24, 2008; 6 pages.
Office Action dated Nov. 16, 2011; U.S. Appl. No. 11/547,187, filed Nov. 24, 2008; 24 pages.
Office Action dated Jul. 23, 2012; U.S. Appl. No. 11/547,187, filed Nov. 24, 2008; 24 pages.
Notice of Allowance dated Dec. 3, 2012; U.S. Appl. No. 11/547,187, filed Nov. 24, 2008; 9 pages.
Office Action dated Dec. 22, 2011; U.S. Appl. No. 12/764,813, filed Apr. 21, 2010; 32 pages.
Office Action dated Aug. 29, 2012; U.S. Appl. No. 12/764,813, filed Apr. 21, 2010; 46 pages.
Notice of Allowance dated Dec. 24, 2012; U.S. Appl. No. 12/764,813, filed Apr. 21, 2010; 11 pages.
Office Action dated Feb. 12, 2015; U.S. Appl. No. 13/616,182, filed Sep. 14, 2012; 24 pages.
PCT International Search Report; Application No. PCT/RU2004/000127; Feb. 7, 2005; 3 pages.
PCT Written Opinion of the International Searching Authority; Application No. PCT/RU2004/000127; Feb. 7, 2005; 9 pages.
European Extended Search Report; Application No. 09176245.0; Mar. 5, 2010; 9 pages.
European Examination Report; Application No. 09176245.0; Feb. 16, 2012; 9 pages.
European Extended Search Report; Application No. 10186326.4; Mar. 30, 2015; 13 pages.
Chinese Office Action; Application No. 201010167591.3; May 24, 2011; 10 pages.
Chinese Office Action; Application No. 201010167591.3; Jan. 31, 2012; 5 pages.
Chinese Office Action as Received in Co-Pending Application No. 201010167591.3 on Nov. 5, 2012; 3 pages. (No English translation available).
Final Office Action dated Aug. 11, 2015; U.S. Appl. No. 13/616,182, filed Sep. 14, 2012; 18 pages.
Notice of Allowance dated Oct. 22, 2015; U.S. Appl. No. 13/616,182, filed Sep. 14, 2012; 9 pages.

* cited by examiner

SPACE-TIME BLOCK CODING SYSTEMS AND METHODS

This application in a continuation of U.S. patent application Ser. No. 11/547,187, filed Nov. 24, 2008, pending, entitled "SPACE-TIME BLOCK CODING SYSTEMS AND METHODS," which is a U.S. National Stage Patent Application of International Application No. PCTRUS2004/000127, filed Apr. 1, 2004, pending, both of which are incorporated herein by reference.

FIELD OF THE INVENTION

This invention relates generally to communications and, in particular, to space-time coding of communication signals.

BACKGROUND

Space-Time Transmit Diversity (STTD) coding for two transmitting antennas has been adopted in many new wireless communication standards including 3GPP ($3^{rd}$ Generation Partnership Project), 3GPP2, and IEEE (Institute of Electrical and Electronics Engineers) 802.16, for example. It has been shown that so-called Alamouti codes for two antennas achieve maximum diversity gain for two transmit antennas and unity coding rate.

Numerous attempts have subsequently been made to search for space-time codes that achieve the maximum diversity gain with unity code rate for more than two antennas.

On the other hand, several studies on the combining of STTD and OTD (Orthonormal Transmit Diversity) have also been carried out. One primary difficulty associated with such coding schemes is that orthonormal complex matrices, which provide for optimal signal reception, have not been found for arbitrary numbers of transmit antennas. Although these combined codes possess simple encoding and decoding algorithms, in the absence of arbitrary-size orthonormal matrices, ad-hoc design of such codes is required, and results in suboptimal performance.

One desirable aspect of STTD techniques is their applicability to single antenna receivers. Key advantages of STTD include maximum diversity gain and relatively simple decoding at a receiver involving only complex multiplications. In addition, while STTD is a complementary coding technique to MIMO (Multiple Input Multiple Output) BLAST, STTD does not require that the number of transmit antennas be less than the number of receive antennas across a communication network.

Therefore, although space-time techniques may provide advantages in communication systems, there are no currently known techniques that exhibit unity code rate and maximum transmit diversity gain for more than two transmit antennas.

SUMMARY OF THE INVENTION

According to an aspect of the invention, multiple space-time coding matrices are determined, each having a respective associated correlation matrix. Each correlation matrix includes non-zero off-diagonal elements. One of the space-time coding matrices for which the associated correlation matrix has a least number of non-zero off-diagonal elements is selected and used to encode data symbols.

The selected space-time coding matrix may include rows respectively corresponding to transmit antennas and columns respectively corresponding to time slots in which the data symbols are to be transmitted.

In one embodiment, the selected space-time coding matrix is punctured, and the data symbols are encoded using the punctured selected space-time coding matrix. The puncturing may be according to either a fixed or an adaptive puncturing ratio.

A phase rotation factor may also be determined and applied to the encoded data symbols. The phase rotation factor is preferably determined to reduce values of the off-diagonal elements of the correlation matrix associated with the selected space-time coding matrix. In a closed loop system, the phase rotation factor or feedback information from which the phase rotation factor is calculated may be received from a receiver to which the data symbols are to be transmitted.

A related receiving method is also provided, and preferably includes receiving and decoding data symbols in a communication signal. The data symbols have been encoded using a space-time coding matrix selected from space-time coding matrices having respective associated correlation matrices which have non-zero off-diagonal elements. The associated correlation matrix for the selected space-time coding matrix has a least number of non-zero off-diagonal elements.

In another aspect, the invention provides a method which included determining multiple space-time coding matrices having respective associated correlation matrices, selecting one of the space-time coding matrices for which a trace of the associated correlation matrix has a maximum power, and encoding data symbols using the selected space-time coding matrix.

A receiving method is also provided, and includes receiving and decoding data symbols in a communication signal, the data symbols having been encoded using a space-time coding matrix selected from space-time coding matrices having respective associated correlation matrices, a trace of the associated correlation matrix for the selected space-time coding matrix having a maximum power.

A system according to another aspect of the invention includes an input and a processor. The input is configured to receive data symbols, and the processor is configured to determine multiple space-time coding matrices, each having a respective associated correlation matrix which has non-zero off-diagonal elements, to select one of the space-time coding matrices for which the associated correlation matrix has a least number of non-zero off-diagonal elements, and to encode the data symbols using the selected space-time coding matrix.

In a still further aspect, the invention also provides a system having an input configured to receive, in a communication signal, data symbols encoded using a space-time coding matrix selected from multiple space-time coding matrices having respective associated correlation matrices which have a plurality of non-zero off-diagonal elements, the associated correlation matrix for the selected space-time coding matrix having a least number of non-zero off-diagonal elements, and a processor configured to decode the encoded data symbols.

A system according to another aspect of the invention includes an input configured to receive data symbols and a processor. The processor is configured to determine a number of space-time coding matrices, each having a respective associated correlation matrix, to select one of the space-time coding matrices for which a trace of the associated correlation matrix has a maximum power, and to encode data symbols using the selected space-time coding matrix.

A related receiving system includes an input configured to receive data symbols in a communication signal and a processor configured to decode the encoded data symbols. The received data symbols have been encoded using a space-time coding matrix selected from space-time coding matrices having respective associated correlation matrices, a trace of the associated correlation matrix for the selected space-time coding matrix having a maximum power.

There is also provided, in yet another aspect, a method in which data symbols are input and encoded. The data symbols are encoded using a space-time coding matrix selected from a number of space-time coding matrices having respective associated correlation matrices. The correlation matrices have non-zero off-diagonal elements, and the associated correlation matrix for the selected space-time coding matrix has a least number of non-zero off-diagonal elements.

Other aspects and features of embodiments of the present invention will become apparent to those ordinarily skilled in the art upon review of the following description of specific embodiments of the invention.

BRIEF DESCRIPTION OF THE DRAWINGS

Examples of embodiments of the invention will now be described in greater detail with reference to the accompanying diagrams, in which.

DETAILED DESCRIPTION OF PREFERRED EMBODIMENTS

In a MIMO communication system with a fixed number of antennas at a transmitter, a variable number of antennas at different receivers, and adaptive coding modulation operation, an increase in the number of receive antennas can increase the order of modulation and thus increase the spectral efficiency. For downlink communications in such a system, a base station or other network element would be a transmitter, whereas a communication terminal or device configured for operation within the communication system would be a receiver.

Consider, for example, a system with M transmit antennas and N receive antennas in a frequency non-selective, slowly fading channel. The sampled baseband-equivalent channel model is given by $$Y = HZ + \eta, \quad (1)$$

where $Y \in C^N$ is a symbol received at a $j^{th}$ one of the N receive antennas;

$H \in C^{N \times M}$ is the complex channel matrix with the $(i,j)^{th}$ element being representative of the complex narrow band Gaussian random process between an $i^{th}$ transmit antenna and the $j^{th}$ receive antenna;

$Z \in C^M$ is a matrix of transmitted symbols, the $i^{th}$ element of $Z \in C^M$ being the symbol transmitted at the $i^{th}$ transmit antenna;

$\eta \in C^N$ is additive white Gaussian noise modeled as a zero mean circularly symmetric complex Gaussian random vector with statistically independent elements, that is, $\eta \sim N(0, 2\sigma_n^2 I_N)$, where $\sigma_n^2$ is the noise variance and $I_N$ is an identity matrix of dimension N; and $C^x$ is a set of x complex numbers.

As described above, orthonormal space-time coding matrices, also referred to as STBC (Space-Time Block Coding) matrices; for arbitrary numbers of transmit antennas have not been found. For systems having more than 2 transmit antennas, there is a very large set of non-orthonormal combinations for such coding. Therefore, a significant task in defining effective space-time coding is to identify a space-time coding matrix to achieve the greatest diversity gain in conjunction with channel coding.

However, it is not feasible to search for the best combinations for space-time coding by simple exhaustive searching, for example. The amount of computation required to search all possible coding matrices and then perform simulation such as Monte-Carlo simulation to investigate diversity gain tends to be prohibitive, even for computer-based searching.

According to an aspect of the present invention, space-time coding matrix design is based on reducing the cross-correlation in a coding matrix linear transformation. Such a transformation, with a reduced number of non-zero correlation coefficients in a correlation matrix, is referred to herein as Quasi-Orthonormal Space-Time Block Coding (QO-STBC). Although strictly not orthonormal, such coding matrices provide many of the advantages of orthonormal coding matrices and are more easily identified by searching, particularly for higher-dimensional systems with more than 2 transmit antennas.

Figure 1:
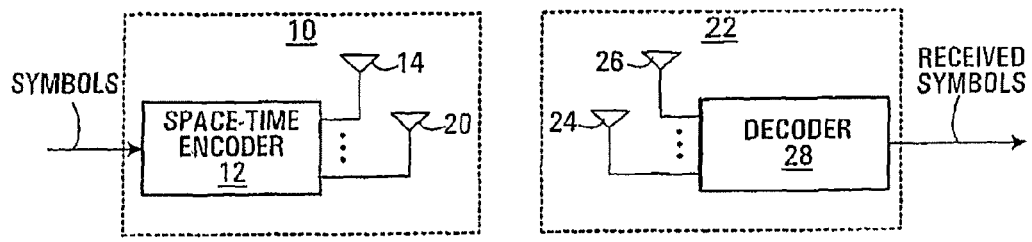
FIG. 1 is a block diagram of a system in accordance with an embodiment of the invention.

FIG. 1 is a block diagram of a system in accordance with an embodiment of the invention. The system of FIG. 1 includes a transmitter 10 and a receiver 22. The transmitter 10 includes a space-time encoder 12 connected to a plurality of M antennas 14, 20. The receiver 22 similarly includes a plurality of N antennas 24, 26 connected to a decoder 28. In a preferred embodiment, the transmitter 10 is implemented at a base station or other network element that supports wireless communications with communication terminals, and the receiver 10 is implemented at one or more communication terminals. The encoder 12, the decoder 28, and possibly other components of the transmitter 10 and the receiver 22 may be provided, for example, by a dedicated processor such as a DSP (digital signal processor) or a general-purpose processor which executes not only signal processing software, but also other software such as operating system software or software applications.

It should be appreciated that the system of FIG. 1 is intended for illustrative purposes only. Embodiments of the invention may be implemented in conjunction with systems having fewer, further, or different components than those shown in FIG. 1. For example, as will be apparent to those skilled in the art to which the present invention pertains, a transmitter may include further components in addition to the encoder 12 and the antennas 14, 20, such as components to receive or process symbols for transmission, to determine or store coding matrices, or to store or otherwise process encoded symbols output by the encoder 12 prior to transmission. Similarly, a receiver may include components to further process received signals decoded by the decoder 28. Also, although two antennas 24, 26 are shown in the receiver 22, the invention is in no way dependent upon multiple receive antennas. A receiver may have one or more antennas. In addition, communication equipment at which the transmitter 10 and the receiver 22 are implemented normally support both transmit and receive operations.

As will become apparent from the following description, the encoder 12 encodes symbols, illustratively modulation symbols such as QPSK (Quadrature Phase Shift Keying) or QAM (Quadrature Amplitude Modulation) symbols, using a coding matrix. Encoded symbols transmitted via the antennas 14, 20 and received by the receiver 22 are decoded by the decoder 28.

Let F(S) denote a matrix of space-time encoded symbols at the output of the encoder 12 for a 2M-dimensional vector of complex input symbols $S=[s_{1,r}, s_{1,i}, s_{2,r}, s_{2,i}, \ldots s_{M,r}, s_{M,i}]^T$, where the subscripts r and i denote real and imaginary components of a complex symbol, respectively. F(S) is then a matrix with 2M×2M dimension. From equation (1), a signal received at a receiver, neglecting noise for convenience, can be written as $$\begin{bmatrix} y_{1,1,r} & \cdots & y_{1,M,r} \\ y_{1,1,i} & \cdots & y_{1,M,i} \\ \cdots & \cdots & \cdots \\ y_{N,1,r} & \cdots & y_{N,M,r} \\ y_{N,1,i} & \cdots & y_{N,M,i} \end{bmatrix} = \begin{bmatrix} h_{1,1,r} & -h_{1,1,i} & \cdots & h_{M,1,r} & -h_{M,1,i} \\ h_{1,1,i} & h_{1,1,r} & \cdots & h_{M,1,i} & h_{M,1,r} \\ \cdots & \cdots & \ddots & \cdots & \cdots \\ h_{1,N,r} & -h_{1,N,i} & \cdots & h_{M,N,r} & -h_{M,N,i} \\ h_{1,N,i} & h_{1,N,r} & \cdots & h_{M,N,i} & h_{M,N,r} \end{bmatrix} F(S), \quad (2)$$

where $y_{n,m,r}$, $y_{n,m,i}$ are real and imaginary components of a complex sample observed at an $n^{th}$ receiving antenna in an $m^{th}$ time instant; and $h_{m,n,r}$, $h_{m,n,i}$ are real and imaginary parts of channel gain from an $m^{th}$ transmitting antenna to the $n^{th}$ receiving antenna.

For a 4×1 antenna configuration with M=4 and N=1, equation (2) can be expressed as $$\begin{bmatrix} y_{1,r} & \cdots & y_{4,r} \\ y_{1,i} & \cdots & y_{4,i} \end{bmatrix} = \begin{bmatrix} h_{1,r} & -h_{1,i} & \cdots & h_{4,r} & -h_{4,i} \\ h_{1,i} & h_{1,r} & \cdots & h_{4,i} & h_{4,r} \end{bmatrix} F(S) \quad (3)$$
$$= HF(S)$$

where $$H = \begin{bmatrix} h_{1,r} & -h_{1,i} & \cdots & h_{4,r} & -h_{4,i} \\ h_{1,i} & h_{1,r} & \cdots & h_{4,i} & h_{4,r} \end{bmatrix}$$

is 2×2M=2×8 matrix of channel gain factors.

In the case of linear STBC, each column of F(S) is a linear combination of components of the S vector. Equation (3) can then be written as $$Y = \begin{bmatrix} y_{1,r} \\ y_{1,i} \\ \cdots \\ y_{M,r} \\ y_{M,i} \end{bmatrix} = \begin{bmatrix} HF_1 \\ \cdots \\ HF_M \end{bmatrix} S \equiv \Phi(H)S, \quad (4)$$

where $F_m$ is a 2M×2M matrix of a linear transformation of the S vector in an $m^{th}$ column of the F(S) matrix.

Taking into account the STBC and the transmitted signal, there exists a linear transformation of the $\Phi(H)S$ vector of symbols. The performance of this transformation will depend on the characteristics of the coding matrix. Therefore, according to an aspect of the invention, a coding matrix search criterion is based on the correlation matrix of such a linear transformation. From equation (4), the correlation matrix may be defined as $$R = \Phi(H)^T \Phi(H) = \sum_{m=1}^{M} F_m^T H^T H F_m. \quad (5)$$

In one embodiment, the number of non-zero correlation coefficients in the correlation matrix is reduced, and preferably minimized. According to a preferred embodiment, unity code rate coding matrices, wherein a number of symbols are transmitted in an equal number of time slots, represented by columns in a coding matrix, are searched to identify a coding matrix with an associated correlation matrix which possesses a minimum number of non-zero elements. Three such complex matrices with only 4 pairs of non-zero correlation coefficients in the corresponding correlation matrices are listed below.

A first type of space-time coding matrix $$F^{(1)}(S) = \begin{bmatrix} s_1 & -s_2^* & -s_3^* & s_4 \\ s_2 & s_1^* & -s_4^* & -s_3 \\ s_3 & -s_4^* & s_1^* & -s_2 \\ s_4 & s_3^* & s_2^* & s_1 \end{bmatrix} \quad (6)$$

has an associated correlation matrix of $$R^{(1)} = \begin{bmatrix} d & 0 & 0 & 0 & 0 & 0 & -2a & 0 \\ 0 & d & 0 & 0 & 0 & 0 & 0 & -2a \\ 0 & 0 & d & 0 & 2a & 0 & 0 & 0 \\ 0 & 0 & 0 & d & 0 & 2a & 0 & 0 \\ 0 & 0 & 2a & 0 & d & 0 & 0 & 0 \\ 0 & 0 & 0 & 2a & 0 & d & 0 & 0 \\ -2a & 0 & 0 & 0 & 0 & 0 & d & 0 \\ 0 & -2a & 0 & 0 & 0 & 0 & 0 & d \end{bmatrix}, \quad (7)$$

where the * operator indicates a complex conjugate; $a = \mathrm{Re}\{h_2 h_3^* - h_1 h_4^*\}$; and $$d = \sum_{m=1}^{M} (h_{m,r}^2 + h_{m,i}^2) = \sum_{m=1}^{M} |h_m|^2.$$

A second type of coding matrix $$F^{(2)}(S) = \begin{bmatrix} s_1 & -s_3^* & -s_4^* & s_2 \\ s_2 & s_4^* & s_3^* & s_1 \\ s_3 & s_1^* & -s_2^* & -s_4 \\ s_4 & -s_2^* & s_1^* & -s_3 \end{bmatrix} \quad (8)$$

has an associated correlation matrix of $$R^{(2)} = \begin{bmatrix} d & 0 & 2b & 0 & 0 & 0 & 0 & 0 \\ 0 & d & 0 & 2b & 0 & 0 & 0 & 0 \\ 2b & 0 & d & 0 & 0 & 0 & 0 & 0 \\ 0 & 2b & 0 & d & 0 & 0 & 0 & 0 \\ 0 & 0 & 0 & 0 & d & 0 & -2b & 0 \\ 0 & 0 & 0 & 0 & 0 & d & 0 & -2b \\ 0 & 0 & 0 & 0 & -2b & 0 & d & 0 \\ 0 & 0 & 0 & 0 & 0 & -2b & 0 & d \end{bmatrix}, \quad (9)$$

where $b = \text{Re}\{h_1 h_2^* - h_3 h_4^*\}$.

For a third type of coding matrix $$F^{(3)}(S) = \begin{bmatrix} s_1 & -s_4^* & -s_2^* & s_3 \\ s_2 & -s_3^* & s_1^* & -s_4 \\ s_3 & s_2^* & s_4^* & s_1 \\ s_4 & s_1^* & -s_3^* & -s_2 \end{bmatrix}, \quad (10)$$

the associated correlation matrix is $$R^{(3)} = \begin{bmatrix} d & 0 & 0 & 0 & 2c & 0 & 0 & 0 \\ 0 & d & 0 & 0 & 0 & 2c & 0 & 0 \\ 0 & 0 & d & 0 & 0 & 0 & 2c & 0 \\ 0 & 0 & 0 & d & 0 & 0 & 0 & 2c \\ 2c & 0 & 0 & 0 & d & 0 & 0 & 0 \\ 0 & 2c & 0 & 0 & 0 & d & 0 & 0 \\ 0 & 0 & 2c & 0 & 0 & 0 & d & 0 \\ 0 & 0 & 0 & 2c & 0 & 0 & 0 & d \end{bmatrix}, \quad (11)$$

where $$c = \text{Re}\{h_1 h_3^* - h_2 h_4^*\}.$$

It is possible to perform column permutations on the above three complex matrices, also referred to herein as mother coding matrices, to get another STBC matrix. However, since such permuted matrices would be one of these three types of QO-STBC matrices with a reduced number of non-zero correlation coefficients, the performance of a permuted matrix will be the same as that of the corresponding mother coding matrix.

The above mother coding matrices are for the illustrative example of 4×1 STTD and block length 4. Extrapolation to other dimensions of communication systems will be apparent to those skilled in the art. With more than one receive antenna, for example, correlation matrices have the same form, but with the following values of the correlation coefficients:

$$a = \sum_{n=1}^{N} \text{Re}\{h_{2,n} h_{3,n}^* - h_{1,n} h_{4,n}^*\};$$

$$b = \sum_{n=1}^{N} \text{Re}\{h_{1,n} h_{2,n}^* - h_{3,n} h_{4,n}^*\};$$

$$c = \sum_{n=1}^{N} \text{Re}\{h_{1,n} h_{3,n}^* - h_{2,n} h_{4,n}^*\}; \text{ and}$$

$$d = \sum_{n=1}^{N} \sum_{m=1}^{M} |h_{m,n}|^2.$$

As those skilled in the art will appreciate, these principles may also be applied for more than 4 transmit antennas, for which correlation coefficients may be determined in a similar manner.

Analyzing the correlation matrices in the above table, it is clear that there exists only pairwise correlation. For each STBC matrix, there exists an associated correlation matrix with unique correlation coefficients. For example, in the first matrix $F^{(1)}(S)$ there exists correlation between symbols $s_1$, $s_4$ and $s_2$, $s_3$, as indicated by the relative position of diagonal elements and off-diagonal elements in the correlation matrix $R^{(1)}$. Similarly, in the second matrix $F^{(2)}(S)$, there exists a correlation between symbols $s_1$, $s_2$ and $s_3$, $s_4$ and, in the third matrix $F^{(3)}(S)$, there exists a correlation between symbols $s_1$, $s_3$ and $s_2$, $s_4$. The correlation coefficients for all three matrices not only have different values, but it is also possible to show that these values are uncorrelated, i.e., $E\{ab\}=E\{bc\}=E\{ac\}=0$. With these properties, the above QO-STBC matrices, can be concatenated into a longer matrix to form a so-called Extended Quasi-Orthonormal Space-Time Block Code (EQO-STBC) as: $F(S_1, S_2, S_3)=$ $$\begin{bmatrix} s_1 & -s_2^* & -s_3^* & s_4 & s_5 & -s_7^* & -s_8^* & s_6 & s_9 & -s_{12}^* & -s_{10}^* & s_{11} \\ s_2 & s_1^* & -s_4^* & -s_3 & s_6 & s_8^* & s_7^* & s_5 & s_{10} & -s_{11}^* & s_9^* & -s_{12} \\ s_3 & -s_4^* & s_1^* & -s_2 & s_7 & s_5^* & -s_6^* & -s_8 & s_{11} & s_{10}^* & s_{12}^* & s_9 \\ s_4 & s_3^* & s_2^* & s_1 & s_8 & -s_6^* & s_5^* & -s_7 & s_{12} & s_9^* & -s_{11}^* & -s_{10} \end{bmatrix}. \quad (12)$$

As the EQO-STBC has unity code rate, with a coding block length of 12 symbols in this case, it can effectively increase the randomization of FEC (Forward Error Correction) code words, and therefore improve system performance. This is preferably achieved in conjunction with effective channel interleaving to randomize any error burst.

QO-STBC and EQO-STBC discussed above can be effectively decoded by a simple linear MMSE (Minimum Mean Squared Error) decoder at a receiver, for example, for all receive antenna configurations based on MISO (Multiple Input Single Output) decoding for a single receive antenna. An increase of the number of receiving antennas in this case essentially allows an increase in power efficiency. However, if the number of receiving antennas is greater than 1, EQO-STBC becomes ineffective from a spectral efficiency point of view. Methods of puncturing may be used to increase the spectral efficiency. Puncturing may be provided, for example, by a puncturer implemented within the encoder 12 or as a separate component of the transmitter 10. In one embodiment, the effective decoding of EQO-STBC may be carried out with an MMSE receiver even at a reduction of half a block length for N=2 receiving antennas. One possible puncturing pattern yields the following Punctured EQO-STBC (PEQO-STBC) coding matrix from the basic mother EQO-STBC coding matrix in equation (12) above:

$$F(S_1, S_2, S_3) = \begin{bmatrix} s_1 & -s_2^* & s_5 & -s_7^* & s_9 & -s_{12}^* \\ s_2 & s_1^* & s_6 & s_8^* & s_{10} & -s_{11}^* \\ s_3 & -s_4^* & s_7 & s_5^* & s_{11} & s_{10}^* \\ s_4 & s_3^* & s_8 & -s_6^* & s_{12} & s_9^* \end{bmatrix} \quad (13)$$

The coding rate for this particular PEQO-STBC is 2, as 12 symbols are transmitted in 6 time slots. Such a code can be used for a 4×2 antenna configuration for instance, with twice higher spectral efficiency than the 4×1 antenna configuration for EQO-STBC.

Further increasing the number of receiving antennas allows more puncturing, and for a 4×4 antenna configuration, we have the well known BLAST coding matrix $$F(S_1, S_2, S_3) = \begin{bmatrix} s_1 & s_5 & s_9 \\ s_2 & s_6 & s_{10} \\ s_3 & s_7 & s_{11} \\ s_4 & s_8 & s_{12} \end{bmatrix} \quad (14)$$

Of course, those skilled in the art will appreciate that different puncturing patterns may be used to yield different PEQO-STBC matrices from the same mother coding matrix. It should be noted that all three types of constructed codes, namely EQO-STBC, PEQO-STBC and BLAST can constitute three adaptive space time coding modes based on the number of receive antennas. A particular space-time coding mode may then be selected based on communication channel conditions, for example, and varied adaptively as conditions change. The receiver 22 has a universal receiver structure for all these three modes, preferably including an MMSE decoder as the decoder 28, and possibly other common receiver components such as a soft de-mapper and a turbo decoder.

Figure 2:
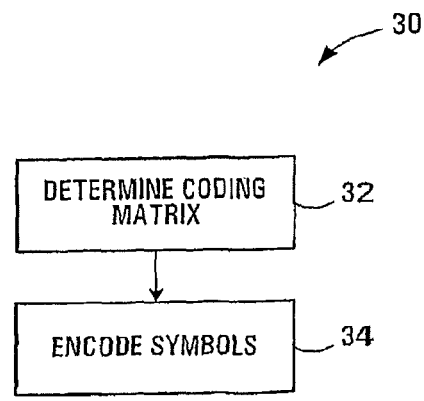
FIG. 2 is a flow diagram illustrating a method according to an embodiment of the invention.

FIG. 2 is a flow diagram illustrating a method 30 according to an embodiment of the invention. A space-time coding matrix is determined at 32, by generating a coding matrix or selecting from a number of generated or stored coding matrices, for example. Coding matrices may be previously determined, either internally by an encoder or externally by a separate transmitter component or even a remote component, and stored for later selection and use during encoding of symbols at 34.

Operations at 32 may involve generating a mother coding matrix and then puncturing the mother coding matrix to a desired code rate. Thus, although three unity code rate coding matrices have been described above, coding matrices may be generated and punctured up to unity code rate, or higher code rates. Puncturing may also be used to provide adaptive coding, wherein at least one of a puncturing ratio and puncturing pattern is changed, based on communication channel conditions for instance.

Symbols, received from communication circuitry at a transmitter for example, are encoded at 34 using the coding matrix determined at 32. The encoded symbols may be transmitted after encoding at 34 or stored for later transmission. Of course, encoded symbols may also be further processed by communication circuitry before transmission.

The present invention is in no way restricted to the particular method shown in FIG. 2. As described above, further operations such as puncturing may be performed. In addition, a coding matrix may be generated or selected before symbols are received for encoding at 34. In a preferred embodiment, one or more mother coding matrices, such as the matrices $F^{(1)}$ through $F^{(3)}$ above, are generated and stored in memory at a transmitter for later use as QO-STBC matrices or to generate EQO-STBC or PEQO-STBC matrices, which may also be stored for later use. It will therefore be apparent that methods according to embodiments of the invention may perform the steps of FIG. 2 in a different order, and may include fewer or further steps than those explicitly shown.

One conventional coding technique employs an orthonormal 2×2 STBC matrix that provides for diversity order of 2 with two transmit antennas and two receive antennas is known. From a wireless communication network design point of view, $2^{nd}$ order diversity improves the network capacity or user bit rate significantly. However, to achieve $2^{nd}$ order diversity, in general, this type of technique requires that two receive antennas be implemented at a receiver. In the case of a communication terminal, also commonly referred to as a UE (user equipment) or an MS (mobile station), physical size and interference constraints complicate the adoption of two receive antennas. Generally, it is highly desirable to use multiple antennas at a communication network element such as a base station and a single antenna at each communication terminal, to provide a 4×1 system, for example.

This was a primary motivation for 3GPP to launch a transmit diversity study for more than two transmit antennas. Two of the most widely known proposed schemes include so-called D-STTD (Double STTD) with a 4×2 configuration and STTD-OTD with 4×1 configuration and to achieve $2^{nd}$ order diversity gain.

In the case of D-STTD with a 4×2 antenna configuration and the following coding matrix $$F(S_1) = \begin{bmatrix} s_1 & -s_2^* \\ s_2 & s_1^* \\ s_3 & -s_4^* \\ s_4 & s_3^* \end{bmatrix}, \quad (15)$$

the correlation matrix can be written as:

$$R = \begin{bmatrix} d_{12} & 0 & 0 & 0 & e & -f & -a & -g \\ 0 & d_{12} & 0 & 0 & f & e & g & -a \\ 0 & 0 & d_{12} & 0 & a & -g & -e & f \\ 0 & 0 & 0 & d_{12} & g & a & -f & -e \\ e & f & a & g & d_{34} & 0 & 0 & 0 \\ -f & e & -g & a & 0 & d_{34} & 0 & 0 \\ -a & g & -e & -f & 0 & 0 & d_{34} & 0 \\ -g & -a & f & -e & 0 & 0 & 0 & d_{34} \end{bmatrix}, \quad (16)$$

where, $$d_{1,2} = \sum_{n=1}^{N} \sum_{m=1,2} |h_{m,n}|^2;$$

$$d_{3,4} = \sum_{n=1}^{N} \sum_{m=3,4} |h_{m,n}|^2;$$

$$a = \sum_{n=1}^{N} \text{Re}\{h_{2,n} h_{3,n}^* - h_{1,n} h_{4,n}^*\};$$

-continued $$e = \sum_{n=1}^{N} \text{Re}\{h_{1,n}h_{3,n}^* + h_{2,n}h_{4,n}^*\};$$

$$f = \sum_{n=1}^{N} \text{Re}\{-h_{1,n}h_{3,n}^* + h_{2,n}h_{4,n}^*\}; \text{ and}$$

$$g = \sum_{n=1}^{N} \text{Re}\{-h_{2,n}h_{3,n}^* - h_{1,n}h_{4,n}^*\}.$$

It will be apparent to those skilled in the art that the diagonal elements of this matrix are proportional to the power of two symbols only, represented by channel factors $h_{m,n}$, and that each of them has a central $\chi^2$ distribution with 8 degrees of freedom. With this configuration, 6 other diagonal values are also possible, each being proportional to the power of other pairs of symbols and having $\chi^2$ central distribution with 8 degrees of freedom.

In accordance with another aspect of the invention, a version of coding is determined at which all 8 values are present in one correlation matrix. Such a scheme is possible, for example, where different coding schemes are used for real and imaginary parts of complex symbols. The following coding matrix represents a version of partial optimized Non-Orthonormal STTD determined according to one embodiment of the invention:

$$F(S_1) = \text{Re}\left\{\begin{bmatrix} s_1 & s_2 \\ -s_2^* & s_1^* \\ s_3 & s_4 \\ -s_4^* & s_3^* \end{bmatrix}\right\} + j\text{Im}\left\{\begin{bmatrix} s_1 & s_2 \\ -s_2^* & s_1^* \\ s_3 & s_4 \\ -s_4^* & s_3^* \end{bmatrix}\right\} \quad (17)$$

$$= \begin{bmatrix} s_1 & \text{Re}\{s_2\} + j\text{Im}\{s_3\} \\ s_2 & \text{Re}\{-s_3\} + j\text{Im}\{-s_4\} \\ s_3 & \text{Re}\{-s_4\} + j\text{Im}\{-s_1\} \\ s_4 & \text{Re}\{-s_1\} + j\text{Im}\{s_2\} \end{bmatrix},$$

with the correlation matrix $$R = \begin{bmatrix} \bar{h}_1^2 + \bar{h}_4^2 & * & * & * & * & * & * & * \\ * & \bar{h}_1^2 + \bar{h}_3^2 & * & * & * & 0 & * & * \\ * & * & \bar{h}_2^2 + \bar{h}_1^2 & * & * & * & * & * \\ * & * & * & \bar{h}_2^2 + \bar{h}_4^2 & * & * & * & 0 \\ 0 & * & * & * & \bar{h}_3^2 + \bar{h}_2^2 & * & * & * \\ * & * & * & * & * & \bar{h}_3^2 + \bar{h}_1^2 & * & * \\ * & * & 0 & * & * & * & \bar{h}_4^2 + \bar{h}_3^2 & * \\ * & * & * & * & * & * & * & \bar{h}_4^2 + \bar{h}_2^2 \end{bmatrix},$$

where $$\bar{h}_k^2 = \sum_{n=1}^{N} |h_{k,n}|^2;$$

and * represents non-zero elements.
The calculation of the non-zero elements will be apparent to those skilled in the art, and as such, the values are not explicitly specified herein for brevity.

It can be seen that the diagonal elements of the above correlation matrix contain all of the possible combinations of channel matrix elements, and that a large number of non-zero correlation coefficients is also introduced. This coding scheme is referred to herein primarily as Randomised Non-Orthonormal STBC (RNO-STBC), with a coding rate of 2 in the above example. Whereas embodiments of QO-STBC as described above are designed to minimize a number of non-zero correlation coefficients, which are off-diagonal elements of a correlation matrix associated with an QO-STBC coding matrix, RNO-STBC is designed to increase or enhance, and preferably maximize, the power of a trace of the correlation matrix.

Figure 3:
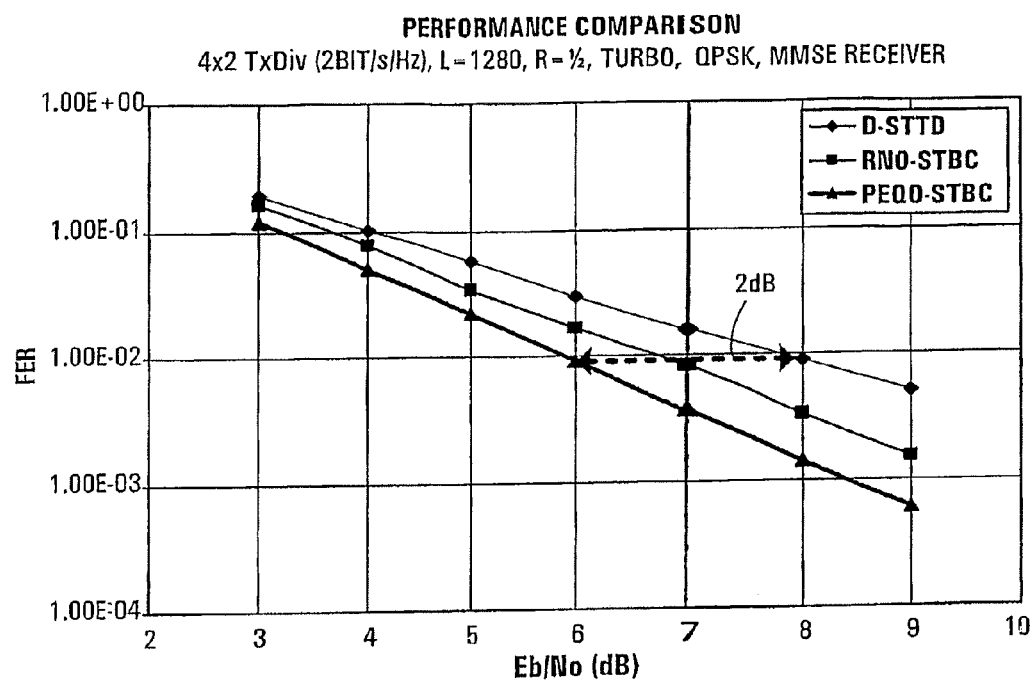
FIG. 3 is a plot of FER (Frame Error Rate) versus Eb/No (Energy per Bit to Spectral Noise Density ratio) for simulations of embodiments of the invention and an example 4×2 communication scheme.

FIG. 3 is a plot of FER versus Eb/No for simulations of embodiments of the invention and an example 4×2 communication scheme. It should be appreciated that the plot of FIG. 3 is presented solely for the purpose of illustration, and that the invention is in no way limited to the simulation conditions listed at the top of FIG. 3. The frame length L=1280 is one illustrative example frame length, rate R=½ Turbo coding represents further processing that may be performed on symbols before or after space-time encoding, and modulation by QPSK is an example of a technique for generating data symbols. Similarly, an MMSE receiver is one example of a type of receiver in conjunction with which symbols encoded according to embodiments of the invention may be decoded. Other suitable types of receiver may be apparent to those skilled in the art.

As can be seen from the simulation results in FIG. 3, RNO-STBC outperforms D-STTD, providing approximately a 1 dB gain thereover at an FER of about 1.00E-02, and PEQO-STBC outperforms both RNO-STBC and D-STTD. As shown, PEQO-STBC provides approximately 2 dB gain over D-STTD for the simulation conditions at an FER of about 1.00E-02.

The simulation results of FIG. 3 correspond to a 4×2 antenna configuration. The techniques described above are also applicable to 4×1 configurations, as well as others. Those skilled in the art will appreciate that STTD-OTD for an illustrative example 4×1 configuration is similar to D-STTD, with a coding matrix $$F(S_1) = \begin{bmatrix} s_1 & s_1 & s_2 & s_2 \\ -s_2^* & -s_2^* & s_1^* & s_1^* \\ s_3 & s_3 & s_4 & s_4 \\ -s_4^* & -s_4^* & s_3^* & s_3^* \end{bmatrix}. \quad (19)$$

Figure 4:
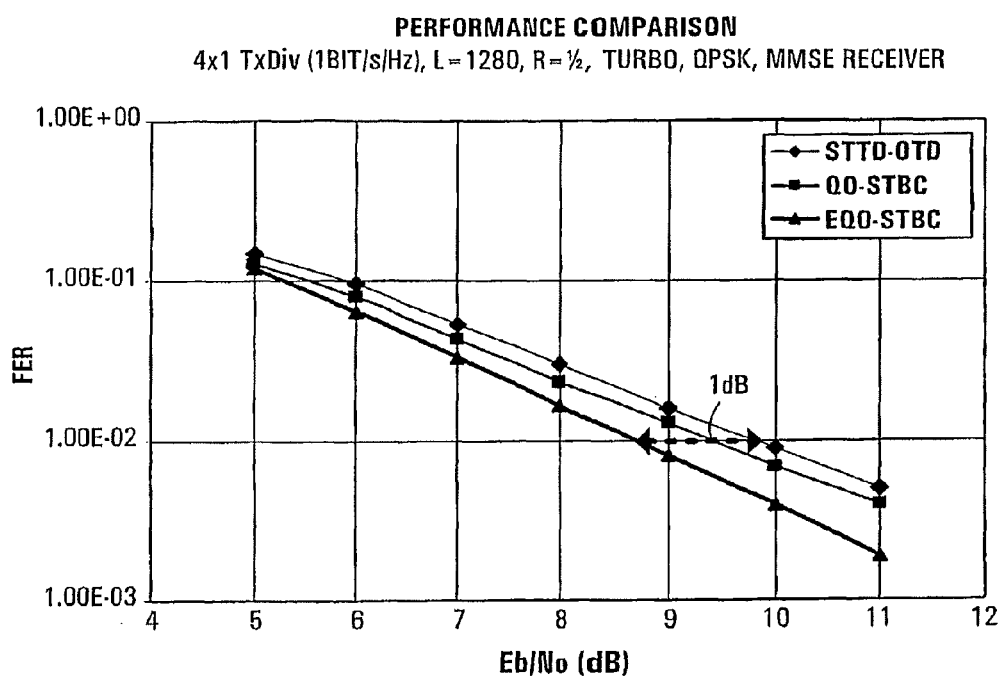
FIG. 4 is a plot of FER versus Eb/No for simulations of embodiments of the invention and an example 4×1 communication scheme.
Figure 5:
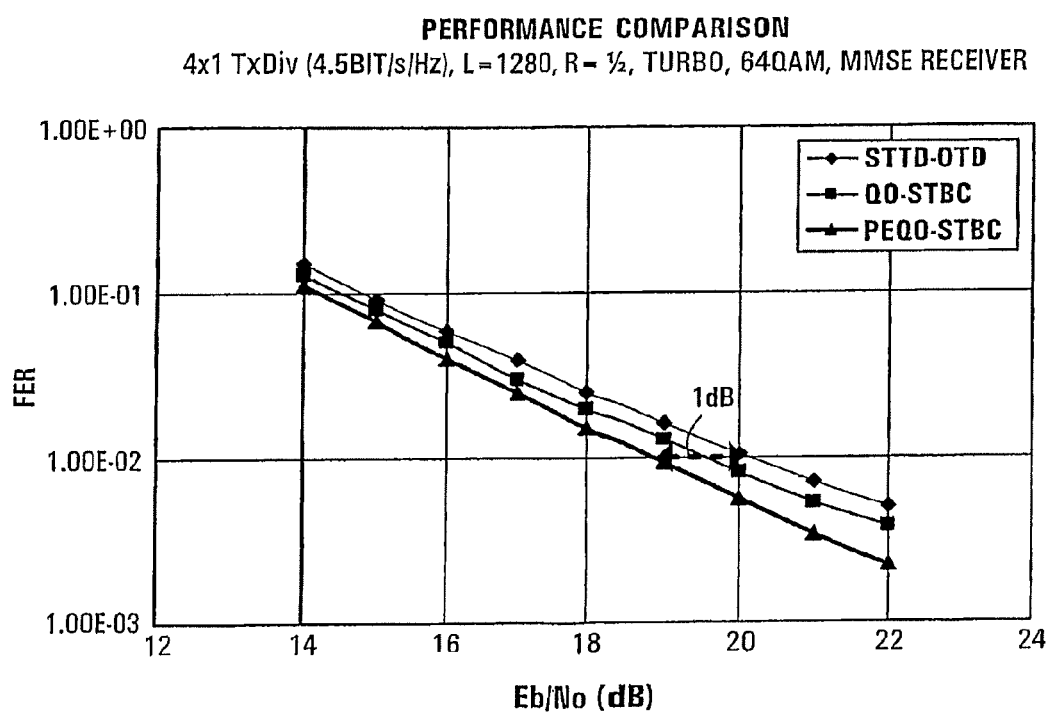
FIG. 5 is a plot of FER versus Eb/No for simulations of further embodiments of the invention and an example 4×1 communication scheme.

FIGS. 4 and 5 are plots of FER versus Eb/No for simulations of embodiments of the invention and an example 4×1 communication scheme. As described above in conjunction with FIG. 3, it should be appreciated that the plots of FIGS. 4 and 5 are presented for illustrative purposes, and that the invention is in no way limited to these particular simulation conditions, with Turbo coding and modulation by QPSK (FIG. 4) or 64QAM (FIG. 5).

In both FIGS. 4 and 5, QO-STBC outperforms STTD-OTD, and EQO-STBC outperforms QO-STBC, providing an approximate 1 dB gain over STTD-OTD at an FER of about 1.00E-02.

Referring again to the above QO-STBC coding matrices, the correlation factors in the corresponding correlation matrices are defined only by one value. For example, for the first QO-STBC matrix $F^{(1)}$ with correlation matrix $R^{(1)}$, we have $$|R_{k,m}|=2|Re\{h_1h_4^* - h_2h_3^*\}| \quad (20)$$

where $(k,m) \in \{(1_r,4_r),(1_i,4_i),(2_r,3_r),(2_i,3_i)\}$.
Introducing a phase rotation factor for the first and second transmitting antennas as $$\Theta_{1,2} = \exp(j\theta_{1,2}), \quad (21)$$

the correlation factor, with this phase rotating factor, becomes $$|R_{m,n}| = 2|Re\{\Theta_{1,2}(h_1h_4^* - h_2h_3^*)\}|. \quad (22)$$

If the phase angle of the phase rotating factor is calculated as $$\theta_{1,2} = -\arg(h_1h_4^* - h_2h_3^*) + \pi/2, \quad (23)$$

then all correlation factors will be equal to zero. If the number of receiving antennas is more than one, then the following similar rule may be defined for the correction phase rotation:

$$\theta_{1,2} = -\arg\left\{\sum_{n=1}^{N}(h_{1,n}h_{4,n}^* - h_{2,n}h_{3,n}^*)\right\} + \pi/2. \quad (24)$$

Thus, by tuning of phases of both first and second transmitting antennas with the same value, according to an embodiment of the invention, it is possible to orthonormalize the covariance matrix of STBC coding. In this case, diversity gain will be maximum, equal to 4 for a 4×1 system.

Similarly, for the second type of QO-STBC matrix above, we have $$|R_{m,n}| = 2|Re\{h_1h_2^* - h_3h_4^*\}|. \quad (25)$$

For this type of QO-STBC, the phases of the first and third transmitting antennas are preferably tuned with the phase angle $$\theta_{1,3} = -\arg\{h_1h_2^* - h_3h_4^*\}|. \quad (26)$$

For the third type of QO-STBC matrix, $$|R_{m,n}| = 2|Re\{h_1h_3^* - h_2h_4^*\}|, \quad (27)$$

and the phases of first and fourth transmitting antennas are preferably tuned using the phase angle $$\theta_{1,4} = -\arg(h_1h_3^* - h_2h_4^*) + \pi/2. \quad (28)$$

As the above phase angles are dependent only upon channel characteristics, these phase angles may also be used for tuning antennas where permutations or punctured versions of $F^1$, $F^{(2)}$, and $F^{(3)}$ are used.

Figure 6:
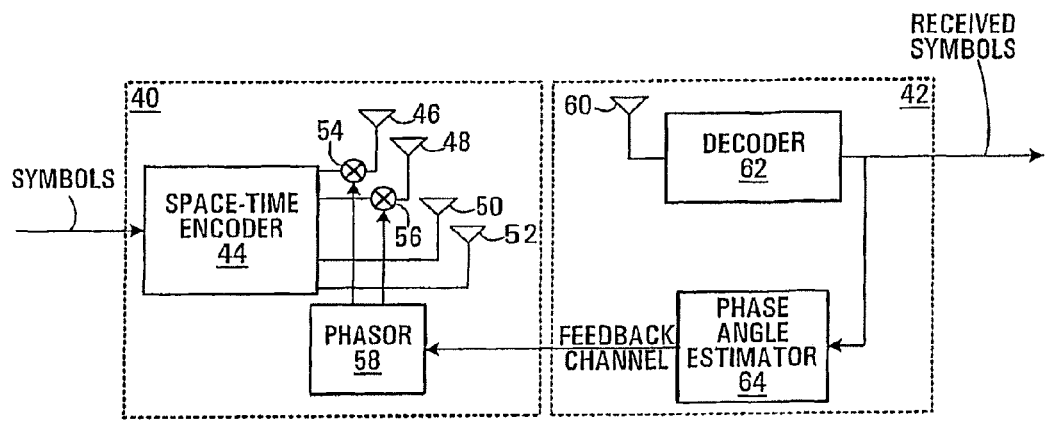
FIG. 6 is a block diagram of a closed loop system according to an embodiment of the invention.

FIG. 6 is a block diagram of a closed loop system according to an embodiment of the invention. The example closed loop system of FIG. 6 includes a transmitter 40, and a receiver 42. The transmitter 40 includes a space-time encoder 44, connected to M=4 antennas 46, 48, 50, 52, complex multipliers 54, 56 connected in a signal path between the encoder 44 and the first two antennas 46, 48, and a phasor 58 connected to the complex multipliers 54, 56. The receiver 42 includes an antenna 60 connected to a decoder 62, which is connected to a phase angle estimator 64. Although a separate feedback channel between the receiver 42 and the transmitter 40 has been explicitly shown in FIG. 6, those skilled in the art will appreciate that such a channel is preferably provided as a wireless communication channel, such that feedback information described in further detail below is fed back to the transmitter 40 by the receiver 42 via the antenna 60. As above, the transmitter 40 and the receiver 42 may include further or different components than those explicitly shown in FIG. 6.

In the transmitter 40, the encoder 44 and the antennas 46, 48, 50, 52 operate substantially as described above to encode and transmit symbols to the receiver 42. The decoder 62 decodes symbols received by the antenna 60.

In accordance with an embodiment of the invention, a phase angle of a phase rotation factor is determined by the phase angle estimator 64 based on communication channel gain factors, as described above. In a preferred embodiment, feedback information includes a single real number which is independent of the number of receive antennas, 1 in FIG. 6. An estimated phase angle can be quantized, for example, with the choice of the following three set of values for 1-, 2-, and 3-bit feedback:

1-bit feedback:

$$\left\{0, \frac{\pi}{2}\right\}$$

2-bit feedback:

$$\left\{0, \frac{\pi}{4}, \frac{\pi}{2}, \frac{3\pi}{4}\right\}$$

3-bit feedback:

$$\left\{0, \frac{\pi}{8}, \frac{\pi}{4}, \frac{3\pi}{8}, \frac{\pi}{2}, \frac{5\pi}{8}, \frac{3\pi}{4}, \frac{7\pi}{8}\right\}.$$

Other numbers of feedback bits, quantization step sizes, and quantization levels may also be used.

The feedback information is received at the transmitter 40 and translated into a phase angle by the phasor 58, using the appropriate mapping above for 1-, 2-, or 3-bit feedback for instance. A phase rotation factor is then determined applied to the signals output to the first two antennas 46, 48 by the complex multipliers 54, 56. The complex multipliers 54, 56 are examples of phase shifters and may be replaced with other types of phase shifters in alternate embodiments of the invention.

The system of FIG. 6 represents one illustrative embodiment of a closed loop system. It should be appreciated that the invention is in no way limited thereto.

For example, the system of FIG. 6 provides for phase rotation at the first and second antennas 46, 48, and thus correspond to the first type of QO-STBC matrix above. Systems for the second and third types of QO-STBC matrices will be substantially similar, with the complex multipliers 54, 56 connected in different combinations of the signal paths between the encoder 44 and the antennas 46, 48, 50, 52. Where the function of the complex multipliers 54, 56 is implemented in software, a phase rotation factor may be applied to any combination of the signal paths using substantially the same transmitter.

In addition, the system of FIG. 6 shows feedback of information from the receiver 42 to the transmitter 40. If the transmitter 40 is able to determine channel gain factors, then the determination of a phase angle may be performed at the transmitter 40. Similarly, although the receiver 42 incorporates the phase angle estimator 64 in FIG. 6, a receiver may instead feed back channel gain information to a transmitter for use by the transmitter in determining a phase angle, or determine and feed back a phase rotation factor to be applied at the transmitter 40. In the former case, more feedback information is transmitted by the receiver, but calculation of the phase angle is off-loaded to the transmitter. Thus, it will be apparent that the receiver 42 may feed back a phase rotation factor or information to be used at the transmitter 40 in determining a phase rotation factor.

As described above, different phase angles may be used for different coding matrices. In a preferred embodiment for receiver feedback, the receiver 42 is configured for operation with a particular type of QO-STBC matrix and is adapted to determine corresponding feedback information. According to other embodiments, the transmitter 40 provides an indication of coding matrix type to the receiver 42. Alternatively, the receiver 42 determines feedback information associated with a plurality of coding matrices and either selects and transmits only particular feedback information for a specific coding matrix, or transmits the feedback information to the transmitter 40, which then selects particular feedback information for a coding matrix.

Figure 7:
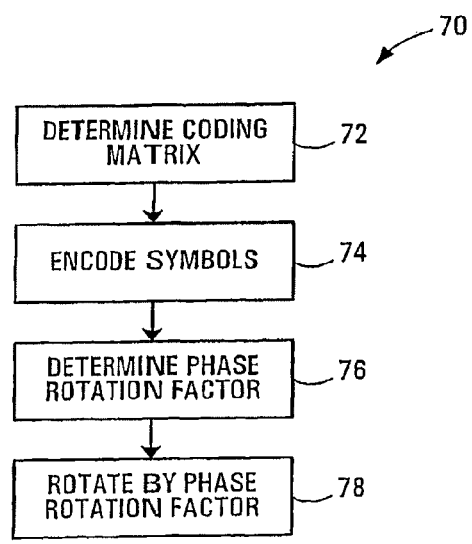
FIG. 7 is a flow diagram of a closed loop method according to an embodiment of the invention.

FIG. 7 is a flow diagram of a closed loop method 70 according to an embodiment of the invention. At 72 and 74, a coding matrix is determined and used to encode symbols, substantially as described above. A phase rotation factor is determined at 76, by a receiver of the encoded symbols in one embodiment of the invention. Encoded symbols are then rotated using the phase rotation factor at 78. The phase rotation factor is preferably determined such that the rotation at 78 forces off-diagonal correlation factors in a correlation matrix of the coding matrix to zero.

Consider now a possible combination of QO-STBC with closed loop control for a 4×2 configuration. In this case, it is possible to use Punctured QO-STBC, by further puncturing the QO-STBC. For the first type of QO-STBC above, after puncturing we have $$F(S_1) = \begin{bmatrix} s_1 & -s_2^* \\ s_2 & s_1^* \\ s_3 & -s_4^* \\ s_4 & s_3^* \end{bmatrix}, \quad (29)$$

which is the same as D-STTD. The correlation matrix, as given above but with slightly different notation, is where
$A = h_{1,r}^2 + h_{1,i}^2$;
$B = h_{2,r}^2 + h_{2,i}^2$;
$C = h_{3,r}^2 + h_{3,i}^2$;
$D = h_{4,r}^2 + h_{4,i}^2$;
$G = h_{1,r}h_{3,r} + h_{1,i}h_{3,i}$;
$H = -h_{1,i}h_{3,r} + h_{1,r}h_{3,i}$;
$K = h_{1,r}h_{4,r} + h_{1,i}h_{4,i}$;
$L = -h_{1,i}h_{4,r} + h_{1,r}h_{4,i}$;
$M = h_{2,r}h_{3,r} + h_{2,i}h_{3,i}$;
$N = -h_{2,i}h_{3,r} + h_{2,r}h_{3,i}$;
$Q = h_{2,r}h_{4,r} + h_{2,i}h_{4,i}$; and
$P = -h_{2,i}h_{4,r} + h_{2,r}h_{4,i}$.

The total power of correlation peaks with several receive antennas will be $$\Sigma R^2 = (G+Q)^2 + (H-P)^2 + (M-K)^2 + (N+L)^2 = |H_{31}+H_{24}|^2 + |H_{32}-H_{14}|^2 \quad (31)$$

where $$H_{13} = \sum_{n=1}^{N} h_{1,n} h_{3,n}^*;$$

$$H_{24} = \sum_{n=1}^{N} h_{2,n} h_{4,n}^*;$$

$$H_{32} = \sum_{n=1}^{N} h_{3,n} h_{2,n}^*; \text{ and}$$

$$H_{14} = \sum_{n=1}^{N} h_{1,n} h_{4,n}^*.$$

With the above common rotating factor $\Theta_{1,2} = \exp(j\theta_{1,2})$ for both the first and second transmitting antennas, the total power of correlation peaks will be depend on the phase of rotating factor, as follows:

$$\sum R(\theta_{1,2})^2 = |H_{31}\exp(-j\theta_{1,2}) + H_{24}\exp(j\theta_{1,2})|^2 + \quad (32)$$
$$|H_{32}\exp(-j\theta_{1,2}) - H_{14}\exp(j\theta_{1,2})|^2.$$

It can be shown that such a total power of correlation peaks has a minimum value with respect to certain rotation phase $\theta_{1,2}$. Thus, based on phase tuning of the first and second transmitting antennas with the phase $\theta_{1,2}$, it is possible to reduce the total level of correlation peaks of an STBC transformation for a 4×2 configuration. From the foregoing description of phase angle determination, derivation of corresponding phase angle values for this embodiment will be apparent to those skilled in the art.

$$R = \begin{bmatrix} A+B & 0 & 0 & 0 & G+Q & -H+P & K-M & -L-N \\ 0 & A+B & 0 & 0 & H-P & G+Q & L+N & K-M \\ 0 & 0 & B+A & 0 & M-K & -N-L & -Q-G & -P+H \\ 0 & 0 & 0 & B+A & N+L & M-K & P-H & -Q-G \\ G+Q & H-P & M-K & N+L & C+D & 0 & 0 & 0 \\ -H+P & G+Q & -N-L & M-K & 0 & C+D & 0 & 0 \\ K-M & L+N & -Q-G & P-H & 0 & 0 & D+C & 0 \\ -L-N & K-M & -P+H & -Q-G & 0 & 0 & 0 & D+C \end{bmatrix}, \quad (30)$$

Figure 8:
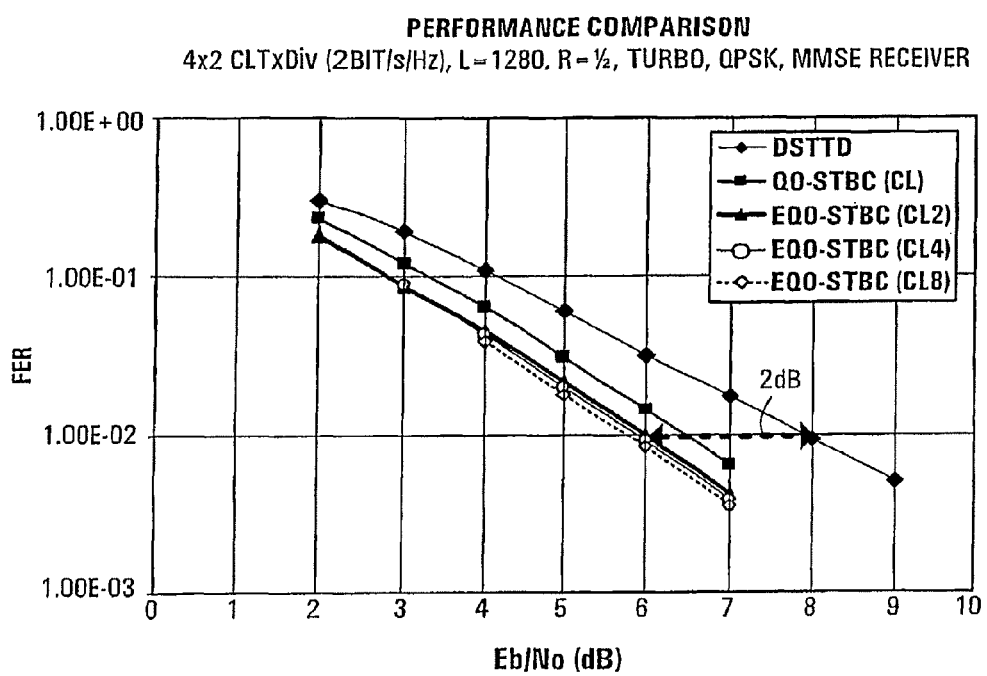
FIG. 8 is a plot of FER versus Eb/No for simulations of closed loop embodiments of the invention and an example conventional closed loop communication scheme.

FIG. 8 is a plot of FER versus Eb/No for simulations of closed loop embodiments of the invention and an example conventional closed loop communication scheme. As shown, for the particular simulation conditions indicated at the top of FIG. 8, to which the invention is in no way limited, 1-bit feedback, indicated by QO-STBC(CL), provides an approximate gain of 1.5 dB over the closed loop D-STTD scheme at an FER of about 1.00E-02. 2-, 4-, and 8-bit feedback, indicated by CL2, CL4, and CL8, respectively, provide an approximate gain of 2 dB over closed loop D-STTD at the same FER.

Figure 9:
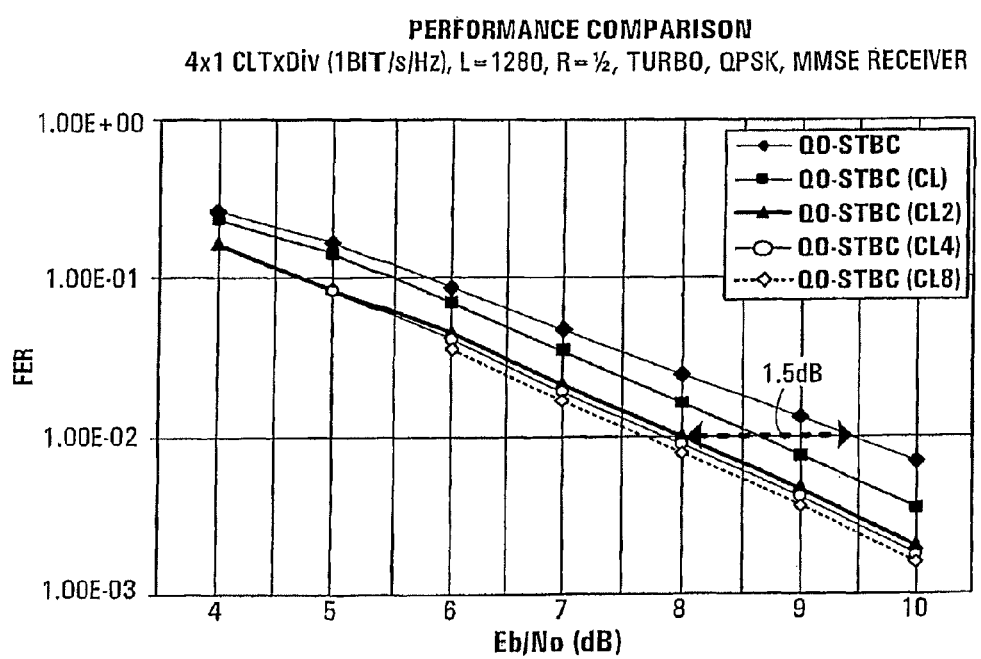
FIG. 9 is a plot of FER versus Eb/No for simulations of open loop and closed loop embodiments of the invention.

FIG. 9 is a plot of FER versus Eb/No for simulations of open loop and closed loop embodiments of the invention. In this case, for the listed simulation conditions, 1-bit feedback provides approximately 0.75 dB gain, and 2-, 4-, and 8-bit feedback provide a higher gain of approximately 1.5 dB at an FER of about 1.00E-02.

For all of the simulation results presented herein, it should be appreciated that simulation conditions are intended for illustrative purposes only, and that the invention is in no way limited thereto. Also, simulation results are expected to vary from those shown for different simulation conditions.

Figure 10:
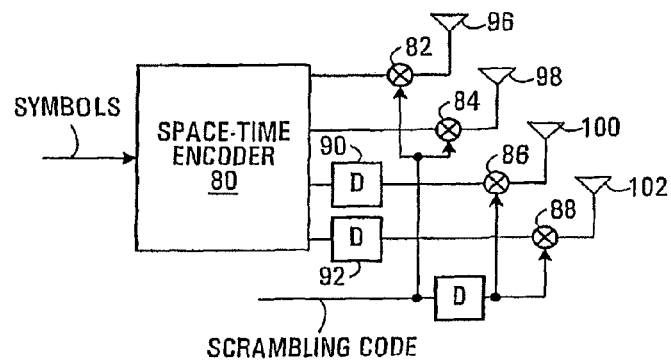
FIG. 10 is a block diagram of an embodiment of the invention adapted for a CDMA (Code Division Multiple Access) communication system.
Figure 11:
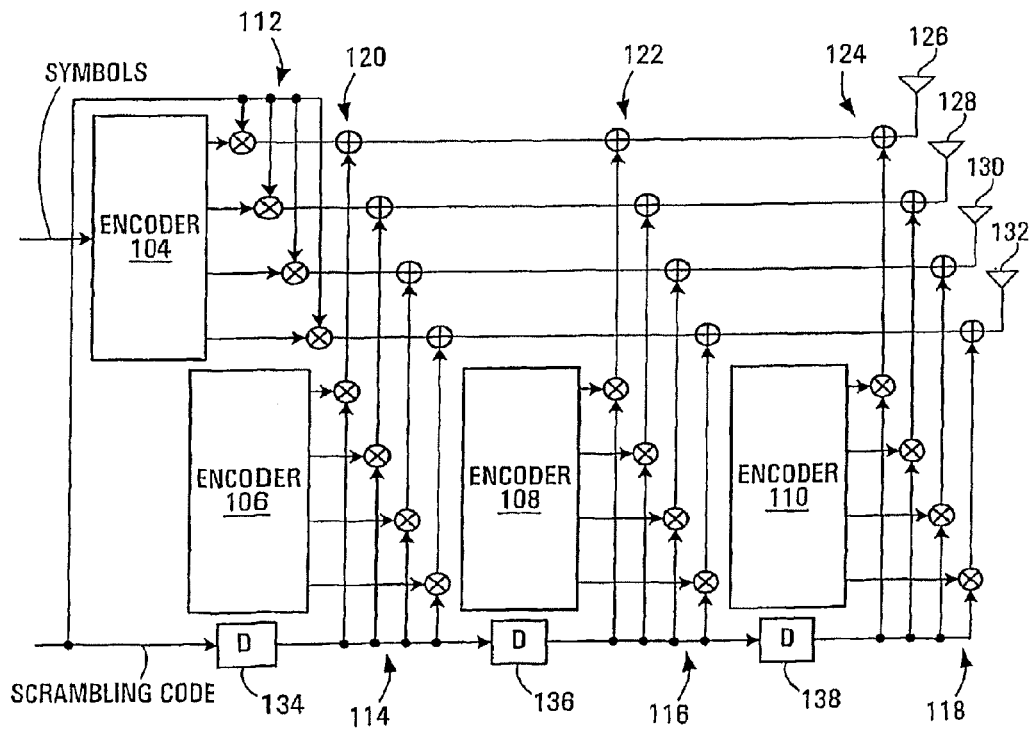
FIG. 11 is a block diagram of a further embodiment of the invention adapted for a CDMA communication system.

FIGS. 10 and 11 are block diagrams of embodiments of the invention adapted for CDMA communication systems. In FIG. 10, outputs of a space-time encoder 80 are connected to complex multipliers 82, 84, 86, 88, which are connected to antennas 96, 98, 100, 102. Delay stages 90, 92 are connected in signal paths between the encoder 80 and the multipliers 86, 88 to delay encoded symbols. The delay stage 94 similarly delays a scrambling code which is retrieved from memory for instance.

In operation, scrambling codes are applied to encoded symbols from the encoder 80, which have been encoded using a space-time coding matrix as described above, in the complex multipliers 82, 84, 86, 88. The delay stages 90, 92, 94 create additional delayed versions of the signals as artificial multipath signals. Generation of such multipath signals can be considered a form of space time coding, and as such, the multipath signals may therefore be separated and combined by a space time decoder.

The system of FIG. 11, which is an alternative realization of a 4 transmit antenna QO-STTD scheme, includes a plurality of encoders 104, 106, 108, 110, having inputs connected to receive symbols to be transmitted and outputs connected to complex multipliers 112, 114, 116, 118. The complex multipliers are connected to signal combiners, illustratively adders 120 122, 124. The outputs of the adders 124 are connected to antennas 126, 128, 130, 132. The delay stages 134, 136, 138 delay the scrambling code for input to the complex multipliers 114, 116, 118.

The operation of the system of FIG. 11 is similar to the system of FIG. 10, in that a scrambling code is applied to encoded symbols output from the encoders 104, 106, 108, 110 by the complex multipliers 112, 114, 116, 118. However, in FIG. 11, the space and time aspects of space-time coding are separated. Each of the encoders 104, 106, 108, 110 effectively encodes input symbols using respective columns of a space-coding matrix. Thus, symbols for transmission during a first time slot are encoded by the encoder 104, and symbols for subsequent respective time slots are encoded by the encoders 106, 108, 110. Each of the delay stages 134, 136, 138 delays the scrambling code by one time slot, such that the scrambling code is aligned with the symbols for a corresponding time slot.

What has been described is merely illustrative of the application of the principles of the invention. Other arrangements and methods can be implemented by those skilled in the art without departing from the spirit and scope of the present invention.

For example, although embodiments of the invention have been described above primarily in the context of symbols, illustratively QPSK or QAM symbols, the invention is in no way limited thereto. A symbol includes not only such modulation symbols, but also other types of portions, sections, or processed versions of information to be transmitted.

In addition, embodiments of the invention may be implemented in conjunction with many different frame and time slot structures. According to a preferred embodiment, a coding scheme is adapted for a frame and slot structure compatible with HSDPA (High Speed Downlink Packet Access).

The invention claimed is:

1. A transmitter in a wireless communication system comprising:

a processor configured to determine a plurality of space-time coding matrices, the plurality of space-time coding matrices each having an associated correlation matrix comprising a plurality of non-zero off-diagonal elements and to select one of the plurality of space-time coding matrices for which the associated correlation matrix has a least number of non-zero off-diagonal elements; and an encoder to encode data symbols using the selected space-time coding matrix; and to apply a phase rotation factor to the encoded data symbols prior to transmission.

2. The transmitter of claim 1, wherein the encoder determines the phase rotation factor to be applied to encoded data bits to reduce values of the non-zero off-diagonal elements of the correlation matrix associated with the selected space-time coding matrix.

3. The transmitter of claim 1, wherein the selected space-time coding matrix is punctured, and the data symbols are encoded using the punctured selected space-time coding matrix.

4. The transmitter of claim 1, wherein the phase rotation factor is determined based on feedback information received from a receiver to which the encoded data symbols are to be transmitted.

5. The transmitter of claim 4, wherein the feedback information comprises a code representing a phase angle of the phase rotation factor, determined based on communication channel gain factors.

6. The transmitter of claim 5, wherein the code has a length selected from the group consisting of: 1 bit, 2 bits, and 4 bits.

7. The transmitter of claim 5, wherein the processor implements a phasor for converting the code to the phase rotation factor.

8. The transmitter of claim 1, further comprising: a plurality of multipliers for applying a scrambling code to respective ones of the encoded data symbols; and a plurality of delay stages connected to at least one of the plurality of multipliers for delaying at least one of the encoded symbols and the scrambling code for the at least one of the plurality of multipliers.

9. The transmitter of claim 1, wherein each of the plurality of space-time coding matrices has a form $$\begin{bmatrix} F_1 \\ F_2 \\ \ldots \\ F_M \end{bmatrix},$$

and each correlation matrix has a form $$R = \sum_{m=1}^{M} F_m^T H^T H F_m,$$

where R is the correlation matrix, and H is a matrix of channel gain factors, M≥1.

10. A wireless communication system comprising:
a receiver comprising:
a plurality of antennas, wherein the plurality of antennas receive data symbols encoded using a space-time coding matrix selected from a plurality of space-time coding matrices, the plurality of space-time coding matrices each having a respective associated correlation matrix comprising a plurality of non-zero off-diagonal elements, wherein the respective associated correlation matrix for the selected space-time coding matrix has a least number of non-zero off-diagonal elements;
a decoder to decode the received data symbols and to determine feedback information; and
a transmitting device transmitting the feedback information, to a transmitter, from which the plurality of antennas receive the data symbols, wherein the feedback information comprises a phase angle for a phase rotation factor to be applied by the transmitter to transmit the encoded data symbols.

11. The receiver of claim 10, wherein the feedback information is determined based on communication channel gain factors.

12. The receiver of claim 10, wherein the phase rotation factor is used to reduce values of off-diagonal elements of a correlation matrix associated with a space time coding matrix used to encode subsequent transmitted data.

13. The receiver of claim 12, wherein the space-time coding matrix has a form $$\begin{bmatrix} F_1 \\ F_2 \\ \ldots \\ F_M \end{bmatrix},$$

and the correlation matrix has a form $$R = \sum_{m=1}^{M} F_m^T H^T H F_m,$$

where R is the correlation matrix, and H is a matrix of channel gain factors, M≥1.

14. A method in a transmitter comprising:
determining a plurality of space-time coding matrices, the plurality of space-time coding matrices each having an associated correlation matrix comprising a plurality of non-zero off-diagonal elements;
encoding data symbols using a space-time coding matrix selected from the plurality of space-time coding matrices with the associated correlation matrix having a least number of non-zero off-diagonal elements; and
applying a phase rotation factor to the encoded data symbols, the phase rotation factor being determined to reduce values of off-diagonal elements of the correlation matrix.

15. The method of claim 14, wherein determining the phase rotation factor comprises receiving the phase rotation factor from a receiver to which the data symbols are to be transmitted, and calculating the phase rotation factor based on the feedback information.

16. The method of claim 15, wherein the feedback information comprises a code representing a phase angle for the phase rotation factor determined on the basis of communication channel gain factors.

17. The method of claim 14, wherein each of the plurality of space-time coding matrices has a form $$\begin{bmatrix} F_1 \\ F_2 \\ \ldots \\ F_M \end{bmatrix},$$

and each correlation matrix has a form $$R = \sum_{m=1}^{M} F_m^T H^T H F_m,$$

where R is the correlation matrix, and H is a matrix of channel gain factors, M≥1.

18. The method of claim 14, further comprising applying a scrambling code to respective ones of the encoded data symbols and delaying the scrambling code and the encoded data symbols.

* * * * *